(12) United States Patent
Wagner et al.

(10) Patent No.: US 7,779,907 B2
(45) Date of Patent: Aug. 24, 2010

(54) DOWNHOLE SHOCK ABSORBER WITH CRUSHABLE NOSE

(75) Inventors: Alan N. Wagner, Tulsa, OK (US); Anthony S. Coghill, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 69 days.

(21) Appl. No.: 12/054,592

(22) Filed: Mar. 25, 2008

(65) Prior Publication Data

US 2009/0242190 A1 Oct. 1, 2009

(51) Int. Cl.
E21B 17/07 (2006.01)
(52) U.S. Cl. .................... 166/169; 166/242.7; 188/371
(58) Field of Classification Search .............. 166/169, 166/242.7; 188/371, 377
See application file for complete search history.

(56) References Cited

U.S. PATENT DOCUMENTS

| | | | | |
|---|---|---|---|---|
| 2,857,510 | A | * | 10/1958 | Haggerty et al. .............. 455/96 |
| 3,032,302 | A | * | 5/1962 | Clark ..................... 244/138 R |
| 3,653,468 | A | | 4/1972 | Marshall |
| 3,949,150 | A | | 4/1976 | Mason et al. |
| 4,020,766 | A | * | 5/1977 | Moyse ........................ 102/231 |
| 4,679,669 | A | * | 7/1987 | Kalb et al. .................. 188/375 |
| 4,693,317 | A | | 9/1987 | Edwards et al. |
| 4,817,710 | A | | 4/1989 | Edwards et al. |
| 4,932,471 | A | | 6/1990 | Tucker et al. |
| 5,083,623 | A | | 1/1992 | Barrington |
| 5,183,113 | A | | 2/1993 | Leaney et al. |
| 5,366,013 | A | | 11/1994 | Edwards et al. |
| 5,875,875 | A | | 3/1999 | Knotts |
| 6,079,496 | A | | 6/2000 | Hirth |
| 6,109,355 | A | | 8/2000 | Reid |
| 6,454,012 | B1 | | 9/2002 | Reid |
| 6,708,761 | B2 | | 3/2004 | George et al. |
| 6,763,696 | B1 | | 7/2004 | Thomas et al. |
| 2006/0124292 | A1 | | 6/2006 | Victor |

OTHER PUBLICATIONS

Skaugen, E., et al., "Perofrmance Testing of Shock Absorbers", SPE 15561, Oct. 1986, 1-12.
Warren, T.M., et al., "Shock Sub Performance Tests", IADC/SPE 39323, Mar. 1998, 267-279.
Zhang, Yang-Lie, et al., "An Investigation of the Functions of Drilling Shock Absorbers" SPE 20324, Jan. 1990, 1-12.

* cited by examiner

*Primary Examiner*—William P Neuder
(74) *Attorney, Agent, or Firm*—Steve Rosenblatt

(57) ABSTRACT

A downhole shock absorber preferably is filled with well fluid in a chamber that is reduced in volume due to impact. A rupture disc can hold the initial non-compressible liquid charge until impact. Upon impact, the rupture disc breaks to allow the fluid to be forced through an orifice to absorb some of the shock that occurs when a string hits a fixed object after dropping in the wellbore. The nose of the shock absorber is a soft material that has voids so that the combination of the softness of the material and the voids allow the nose to reshape until it encounters a surrounding tubular wall and then to collapse inwardly into the voids, making it simple to remove. The nose is releasably mounted to the shock absorber so the two can separate if the nose gets stuck after impact.

19 Claims, 1 Drawing Sheet

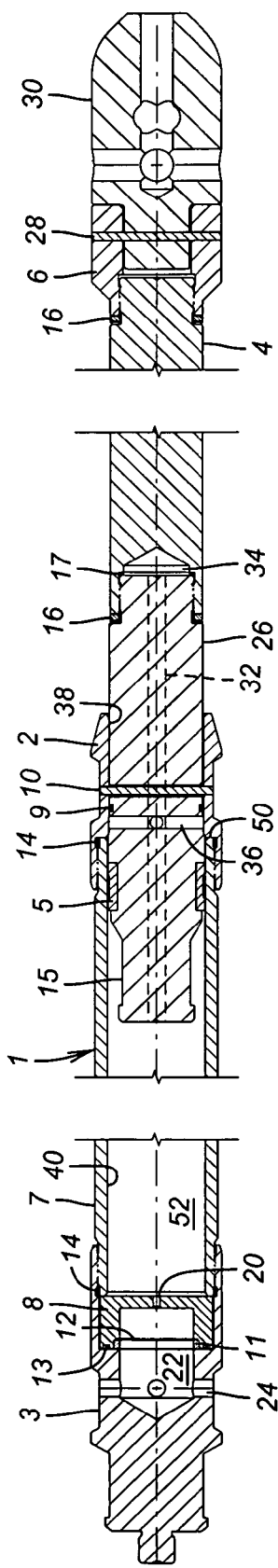
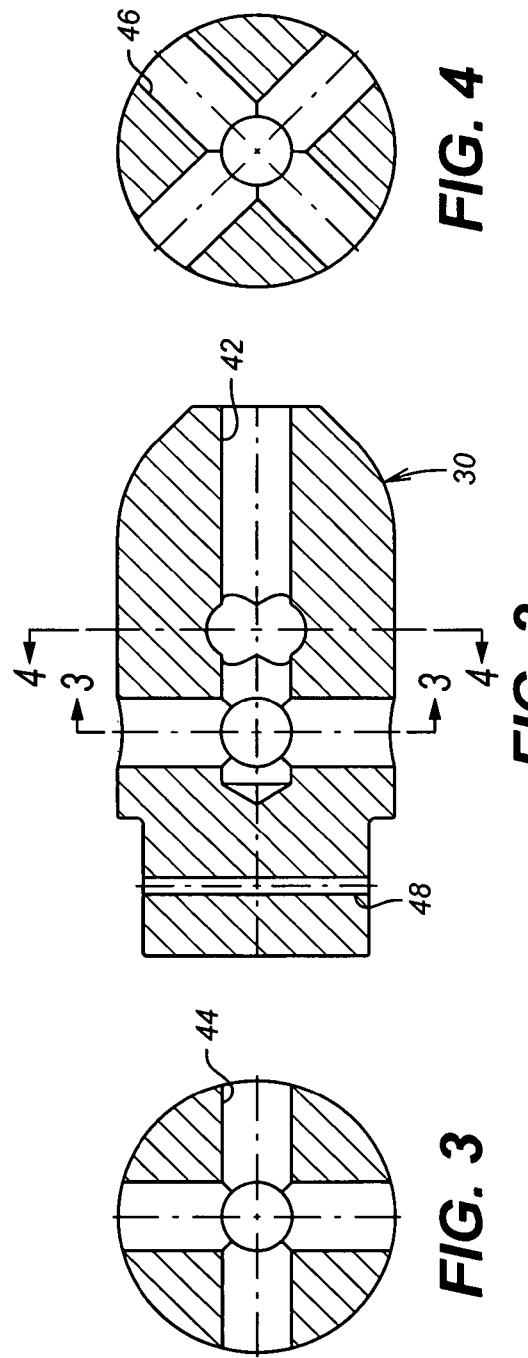
FIG. 1
FIG. 2
FIG. 3
FIG. 4

DOWNHOLE SHOCK ABSORBER WITH CRUSHABLE NOSE

FIELD OF THE INVENTION

The field of the invention is shock absorbers that can lessen damage to downhole components if a tool string is accidentally released and more particularly a crushable nose on a shock absorber to enhance its performance.

BACKGROUND OF THE INVENTION

Shock absorbers are used in downhole applications to protect equipment in the well if a tool string is accidentally released. The kinetic energy of the falling string or other object is dissipated by a shock absorber to reduce or eliminate damage from impact.

In some designs for downhole, relative movement crushes material in the absorber or radially deforms one member as another with an interference fit is forced into it or simply uses a sharpened tungsten carbide element to rip into a telescoping tube. These designs and variations of them are illustrated in U.S. Pat. Nos. 6,454,012; 6,109,355; 6,708,761; 3,653,468; 3,949,150; 4,679,669; 4,693,317; 4,817,710 and 4,932,471. U.S. Pat. No. 5,875,875 relates generally to shock absorbers in unrelated industrial applications such as vehicles, machinery and buildings. It stays away from using liquids and gasses claiming that the cost of precision machining and seals that pneumatic or hydraulic designs entail makes them cost more to fabricate and maintain. Instead it focuses on foams and other materials that can stay in a cavity without seals until the absorber is actuated.

Yet another design for downhole use forces a plunger into a housing and creates an exit flow path to a port for the mud in the housing as the piston top gets further away from the ports. In this manner the resistance to piston movement progressively increases the greater the relative movement between the piston and its surrounding housing. This design is described in U.S. Pat. No. 5,183,113.

It is also worth noting that the design in U.S. Pat. No. 6,109,355 features a leading end 18 made of brass so that it can take the initial impact and dissipate it. The nose 18 features a flow path into the tool string.

The present invention provides a shock absorber that uses well fluids. It is held in the run in position until it receives an impact that creates relative movement. As a result the volume of a fluid chamber preferably filled with incompressible fluid and temporarily retained by a breakable member is reduced as the fluid is forced through an orifice and into the surrounding wellbore. The initial impact is absorbed by a nose intended to be crushed using voids designed to allow it to collapse on itself on impact. These and other features of the present invention will be more apparent to those skilled in the art from a review of the description of the preferred embodiment and the associated drawings that appear below while recognizing that the claims define the full scope of the invention.

SUMMARY OF THE INVENTION

A downhole shock absorber preferably is filled with well fluid in a chamber that is reduced in volume due to impact. A rupture disc can hold the initial non-compressible liquid charge until impact. Upon impact, the rupture disc breaks to allow the fluid to be forced through an orifice to absorb some of the shock that occurs when a string hits a fixed object after dropping in the wellbore. The nose of the shock absorber is a soft material that has voids so that the combination of the softness of the material and the voids allow the nose to reshape until it encounters a surrounding tubular wall and then to collapse inwardly into the voids, making it simple to remove. The nose is releasably mounted to the shock absorber so the two can separate if the nose gets stuck after impact.

BRIEF DESCRIPTION OF THE DRAWINGS

FIG. 1 is a section view of the shock absorber in the run in position;

FIG. 2 is a detailed section view of the nose of the shock absorber shown in FIG. 1;

FIG. 3 is the view along line 3-3 of FIG. 2; and

FIG. 4 is the view along line 4-4 of FIG. 2.

DETAILED DESCRIPTION OF THE PREFERRED EMBODIMENT

Referring to FIG. 1 the tubing string (not shown) is connected to the top of top sub 3. The shock absorber assembly 1 further comprises a housing 7 secured to top sub 3 with a carrier 8 used to sandwich a rupture disc 12 and a retaining ring 11 against the top sub 3. Seals 13 and 14 prevent fluid bypass around the rupture disc 12. Lower sub 2 is connected to housing 7 and the connection is sealed at seal 14. Carrier 8 has an orifice 20 that leads into chamber 22 where the rupture disc 12 is mounted. A series of outlets 24 communicate into the surrounding wellbore.

A piston assembly 26 has an upper body 15 secured to a lower body 4 with set screws 16 and utilizing a seal 17 sealing the connection. Nose retainer 6 is secured to lower body 4 with another seal 16 sealing the connection. A shear pin 28 holds nose 30 to the retainer 6. Upper body 15 has a longitudinal bore 32 that leads from upper cavity 52 to lower chamber 34. Lower chamber 34 can be used to drain upper cavity 52 by unscrewing lower body 4 after the tool is removed from a well. A shear pin 10 holds upper body 15 to lower sub 2 for run in. A seal 9 on upper body 15 initially rides on interior bore 38 of lower sub 2. A bushing 5 on upper body 15, rides on inside diameter 40 of the housing 7.

Referring to FIGS. 2-4 the nose 30 has a longitudinal bore 42 that crosses transverse bores 44 and 46. The purpose of the bores is to remove material so that when nose 30 gets the initial impact its tendency will be to grow radially to meet the surrounding tubular wall and thereafter it can cave in on itself as it is crushed into the passages 42, 44 and 46. This ability to crush inwardly enhances the prospect that when the string (not shown) is pulled out that the nose 30 will not stick in the surrounding tubular. Even if nose 30 sticks after it is crushed, the shear pin 28 in bore 48 can break and the assembly 1 up to and including nose retainer 6 can come out.

It should be noted that inside diameter 38 is smaller than inside diameter 40 and that a shoulder 50 is formed on lower sub 2 to retain the upper body 15 when the string (not shown) that is connected to sub 3 is removed after it has dropped. Because of the difference in dimension between diameters 38 and 40 when there is relative movement between the upper body 15 and the surrounding housing 7 a chamber of increasing volume opens between them. To avoid pulling a vacuum in this chamber that has to grow in volume to allow the piston assembly 26 to move toward orifice 20 bore 32 and passage 36 allow fluid to rush into this growing cavity to avoid pulling a vacuum in it so that the motion of the piston assembly 26 can continue without a resisting force from that enlarging chamber.

In operation when the string (not shown) is dropped, the nose 30 which is preferably made from a soft metal, elastomer, plastic, encased gel or combinations of the above, absorbs the initial impact and crushes longitudinally until it hits the surrounding tubular wall at which point it crushes back inwardly against its various bores. Those skilled in the art will appreciate that the nose needs sufficient structural rigidity to absorb the impact of the encounter with a well obstruction upon impact. However the bores allow further impact absorption by providing an internal void into which the structure of the nose 30 can be crushed to further aid in reducing the severity of the blow against the object in the well that has broken the fall of the string (not shown). Optionally the voids defined by these passages can be filled with a gel or viscous grease for greater absorption of impact followed by expelling the material and the internal collapse of the nose into its voids. As a result the prevailing mode of failure is longitudinal crushing and the risk of getting the nose 30 stuck against the inside wall of the surrounding tubular, making removal more difficult, is diminished. In any event the shock absorber 1 can be pulled up and shear pin 28 can shear leaving the nose in place for subsequent mill out. An upward pull on housing 7 will bring with it the piston assembly 15 due to shoulder 50 retaining the piston assembly 15.

The impact force of the landing of nose 30 will also stop the piston assembly 15 from moving further as the housing 7 continues to move down. This raises the pressure in chamber 52 causing pressure buildup that will break the rupture disc 12. Well fluid that initially filled chamber 52 up to the rupture disc 12 will now be driven through the orifice 20 and into the wellbore through passages 24. It should be noted that it is preferred to pre-fill the chamber 52 with fluid and assemble the rupture disc 12 to initially retain such fluid. The reason is that some wells can have a gas filled upper layer and if the rupture disc was not there the chamber 52 could initially be gas filled. If the string was dropped with the chamber 52 still gas filled there may not be enough time before impact for the chamber 52 to fill with liquid to properly operate and avoid impact damage. In the preferred embodiment a non-compressible fluid filled chamber 52 is maintained with a closure that is removable such as rupture disc 12. Upon reduction of volume of chamber 52 the orifice 20 provides a constant resistance to movement of the housing 7 to further dissipate the shock of impact all before the lower sub 2 reaches a travel limit.

Those skilled in the art will now appreciate that what has been described is a shock absorber with a crushable nose. The nose is configured of a soft material and includes voids to enhance the prospect of longitudinal crushing on impact and to facilitate the removal of the nose after impact. An emergency release from the nose 30 is provided. The number, size and orientation of the voids can be varied as well as the material selection to achieve the desired impact absorption strength. The shock absorber provides a constant resistance to collapse on impact and the removable barrier assured that the preferred non-compressible fluid is fully charged into cavity 52 so that it is there when needed even if the assembly 1 is dropped when it is still in a gas pocket in the well. It should be noted that the rupture disc 12 need not be built to resist the hydrostatic pressure at the final depth for the location of the absorber 1. Rather, the purpose of the rupture disc is simply to retain fluid in chamber 52 long enough to get the shock absorber into a portion of the well that is liquid filled. For that same reason, the components of the absorber 1 do not need to be made thick so as to withstand large differentials because simply running in the absorber 1 can break the disc 12 at shallow depths causing the assembly to be in pressure balance to well fluids. While a rupture disc is preferred, other removable barriers are contemplated that can go away by a variety of techniques such as dissolving, melting or chemically reacting, to mention a few.

The housing 7 with lower sub 2 can literally be pulled apart from a stuck piston assembly 26 after a drop. In the event that assembly 1 becomes separated from the tool string, a fishing tool can then come in on another trip to grab a fishing neck just above the bushing 5 to remove the balance of the tool. Also, should the piston assembly 26 become separated from the lower sub 2, a fishing tool can be used to grab a fishing neck just above the upper body 15.

The housing 7 does not need the pressure rating of the string (not shown) that is disposed above it. The rupture disc 12 is set low enough that minimal relative movement will break it. The orifice 20 is sized to prevent pressure buildup in housing 7 that could deform it plastically and for all intents and purposes the fluid flow through the orifice 20 is low enough so that the wall that defines housing 7 doesn't even flex. One reason for this is that the crushable nose 30 dissipates the brunt of the kinetic energy on impact.

The above description is illustrative of the preferred embodiment and many modifications may be made by those skilled in the art without departing from the invention whose scope is to be determined from the literal and equivalent scope of the claims below.

We claim:

1. A shock absorber system for a tubular string in downhole use, comprising;
a shock absorbing device comprising a housing and a piston defining a variable volume cavity when relative movement between them occurs, said relative movement displacing fluid from said cavity;
a nose on a lower end of said shock absorbing device, said nose comprising at least one void to promote crushing said nose in a longitudinal direction on impact with a fixed object downhole;
said housing and said piston are releasably held together until a force a predetermined magnitude occurs on said nose.

2. The system of claim 1, wherein:
said relative movement displaces fluid from said cavity through an orifice spaced from said piston.

3. The system of claim 1, wherein:
said nose is releasably mounted to said shock absorbing device.

4. A shock absorber system for a tubular string in downhole use, comprising;
a shock absorbing device comprising a housing and a piston defining a variable volume cavity when relative movement between them occurs, said relative movement displacing fluid from said cavity;
a nose on a lower end of said shock absorbing device, said nose comprising at least one void to promote crushing said nose in a longitudinal direction on impact with a fixed object downhole;
said relative movement displaces fluid from said cavity through an orifice spaced from said piston;
said cavity further comprises a breakable member to hold fluid in said cavity until said relative movement occurs.

5. The system of claim 4, wherein:
said breakable member breaks from increasing hydrostatic pressure as it moves lower in a wellbore.

6. The system of claim 4, wherein:
said breakable member breaks from said relative movement between said piston and said housing.

7. The system of claim 6, wherein:

said relative movement builds pressure in said cavity to break said breakable member.

8. The system of claim 7, wherein:
said breakable member comprises a rupture disc.

9. The system of claim 3, wherein:
said housing and said piston are initially held together by at least one shear pin.

10. A shock absorber system for a tubular string in downhole use, comprising;
a shock absorbing device comprising a housing and a piston defining a variable volume cavity when relative movement between them occurs, said relative movement displacing fluid from said cavity;
a nose on a lower end of said shock absorbing device, said nose comprising at least one void to promote crushing said nose in a longitudinal direction on impact with a fixed object downhole as the exclusive way said nose is deformed to absorb shock;
the pressure rating for said housing is lower than the pressure rating of a string that supports it in a wellbore.

11. A shock absorber system for a tubular string in downhole use, comprising;
a shock absorbing device comprising a housing and a piston defining a variable volume cavity when relative movement between them occurs, said relative movement displacing fluid from said cavity;
a nose on a lower end of said shock absorbing device, said nose comprising at least one void to promote crushing said nose in a longitudinal direction on impact with a fixed object downhole;
said piston comprises an upper end disposed substantially in said housing that is larger than a lower end thereof that extends beyond said housing.

12. The system of claim 11, wherein:
said housing comprises an internal shoulder that captures said upper end of said piston to allow removal of said housing to bring said piston with it.

13. The system of claim 12, wherein:
said relative movement creates a variable volume space between said piston and said housing and said piston comprises a passage from said cavity that leads to said space to prevent pressure reduction in said space.

14. A shock absorber system for a tubular string in downhole use, comprising;
a shock absorbing device comprising a housing and a piston defining a variable volume cavity when relative movement between them occurs, said relative movement displacing fluid from said cavity;
a nose on a lower end of said shock absorbing device, said nose comprising at least one void to promote crushing said nose in a longitudinal direction on impact with a fixed object downhole;
said void comprises a passage transverse to a longitudinal axis;
said nose further comprises a longitudinally oriented blind bore that intersects said at least one transverse passage;
said nose collapsing longitudinally and radially into said bore and said passages on impact downhole.

15. A shock absorber system for downhole use, comprising:
a shock absorber device having a lower end; and
a nose mounted to said lower end comprising a longitudinal axis and at least one void to promote crushing said nose in a longitudinal direction on impact with a fixed object downhole;
said nose and said lower end are releasably held together by a breakable member until a force of a predetermined magnitude occurs on said nose with said nose stuck downhole after it is crushed.

16. A shock absorber system for downhole use, comprising:
a shock absorber device having a lower end; and
a nose mounted to said lower end comprising a longitudinal axis and at least one void to promote crushing said nose in a longitudinal direction on impact with a fixed object downhole;
said void comprises a passage transverse to a longitudinal axis;
said nose further comprises a longitudinally oriented blind bore that intersects said at least one transverse passage;
said nose collapsing longitudinally and radially into said bore and said passages on impact downhole.

17. The system of claim 16 wherein:
said nose is releasably mounted to said shock absorbing device.

18. The system of claim 17 wherein:
said nose is made from a soft metal, plastic, elastomers or an encased gel.

19. The system of claim 16 wherein:
said passage contains a fluid that is propelled out of said nose on impact to further diffuse the kinetic energy of impact on said nose.

* * * * *